United States Patent
Boyadjieff

(10) Patent No.: US 8,493,013 B2
(45) Date of Patent: Jul. 23, 2013

(54) ELECTRIC MOTOR CONTROL ALGORITHM WITH BYPASS RELAY

(75) Inventor: George I. Boyadjieff, Villa Park, CA (US)

(73) Assignee: Rocky Research, Boulder City, NV (US)

( * ) Notice: Subject to any disclaimer, the term of this patent is extended or adjusted under 35 U.S.C. 154(b) by 592 days.

(21) Appl. No.: 12/739,346

(22) PCT Filed: Oct. 22, 2008

(86) PCT No.: PCT/US2008/080757
§ 371 (c)(1),
(2), (4) Date: Jul. 27, 2010

(87) PCT Pub. No.: WO2009/055447
PCT Pub. Date: Apr. 30, 2009

(65) Prior Publication Data
US 2010/0283423 A1    Nov. 11, 2010

Related U.S. Application Data

(60) Provisional application No. 60/982,084, filed on Oct. 23, 2007, provisional application No. 60/982,087, filed on Oct. 23, 2007.

(51) Int. Cl.
*H02P 7/00*    (2006.01)

(52) U.S. Cl.
USPC ............ 318/432; 318/729; 318/782; 318/798

(58) Field of Classification Search
USPC .................. 318/432, 729, 782, 798
See application file for complete search history.

(56) References Cited

U.S. PATENT DOCUMENTS

| | | | |
|---|---|---|---|
| 4,052,648 A | 10/1977 | Nola | |
| 4,369,403 A | 1/1983 | Lee | |
| 4,384,243 A * | 5/1983 | Muskovac | 318/729 |
| 4,454,462 A | 6/1984 | Spann | |
| 4,912,390 A | 3/1990 | Curran et al. | |
| 5,013,990 A | 5/1991 | Weber | |
| 5,204,606 A * | 4/1993 | Kuwahara et al. | 318/800 |
| 8,154,232 B2 * | 4/2012 | Reichenbach et al. | 318/400.09 |
| 8,214,097 B2 * | 7/2012 | Severinsky et al. | 701/22 |
| 2005/0275976 A1 * | 12/2005 | Taimela et al. | 361/18 |
| 2006/0108954 A1 | 5/2006 | Sebille et al. | |

* cited by examiner

*Primary Examiner* — Erick Glass
(74) *Attorney, Agent, or Firm* — Knobbe Martens Olson & Bear LLP

(57) ABSTRACT

Aspects of the present invention pertain to a method of power control for an electrical motor using a control bypass feature that allows for the delivery of full supply voltage to a motor when it is operating at or above a certain load threshold level. Advantages of the present invention include the ability to provide power savings at low loads while still a motor to operate at full rated capacity under high load conditions. Also, a load sensor and an override unit that are independent of the phase lag compensation portion of power control allows for faster response to rapid load changes.

21 Claims, 6 Drawing Sheets

ELECTRIC MOTOR CONTROL ALGORITHM WITH BYPASS RELAY

This application is the National Phase of PCT/US2008/080757 filed in Oct. 22, 2008, which claims priority under 35 U.S.C. 119(e) to U.S. Provisional Application No. 60/982,084 filed on Oct. 23, 2007 and 60/982,087 filed on Oct. 23, 2007, all of which are hereby expressly incorporated by reference into the present application.

PRIORITY

This Nonprovisional application claims priority under 35 U.S.C. §119(e) on U.S. Provisional Application No. 60/982,084 filed on Oct. 23, 2007 and U.S. Provisional Application No. 60/982,087, filed on Oct. 23, 2007, the entire contents of both being hereby incorporated by reference.

TECHNICAL FIELD

The present invention relates generally to controlling electrical appliances and equipment, and is more particularly related to methods, systems, and apparatus for controlling an electric motor for the conservation of energy.

BACKGROUND

Power factor measures the ratio of average power to the apparent power in an electrical load. Power factor ranges from a value of 0 (where the impedance of the load is purely reactive) to 1 (for a purely resistive load). In practice, the power factor of electrical devices ranges somewhere between 0 and 1, and the closer this value is to unity, the more efficiently energy is consumed by the device and the less power is wasted. Therefore, for consumers of electricity that employ highly reactive loads (e.g. electrical induction motors), it is crucial that steps be taken to adjust the power factor of their apparent load to improve performance and avoid wasting enormous amounts of power. For example, a mill that consumes 100 kW from a 220-V line with a power factor of 0.85 will require 118 kW of apparent power supplied, but if the power factor is improved to 0.95, the apparent power supplied drops to 105.3 kW. Many utility companies require such consumers to take affirmative steps to adjust power factor.

Large factories are not the only environments to benefit from improvement in power factor. AC motors are present in many different electrical appliances and equipment from compressors to elevators, and since they are usually inductive in their input impedance, they often present a less than desirable power factor rating, especially under light load conditions or during certain periods of load variance. To improve the power factor in AC motors, controllers and control methodologies have been developed and are generally known in the art.

In general, the power factor mitigation approach taken by many AC motor controllers is accomplished by sensing the phase difference between the current and voltage phasors and then using a controller to adjust the actuation of thyristors in each AC motor phase to attempt to reduce the voltage and current phase lag. In an ideal implementation, if the phase between the current and voltage phasors can be brought to zero, the load looks resistive to the power supply, and therefore, the power factor would approach unity. While unity power factor is not entirely practically achievable, small improvements in power factor can make substantial differences in power consumption.

Many different approaches to improving power factor in electrical motors have been developed over the years. Power reduction systems for less than fully loaded induction motors wherein the phase angle between current and voltage (motor power factor) is controlled are already known in the art. In such systems, the motor power factor is controlled as a function of the difference between a commanded power factor signal and the operating power factor, through control of thyristors (e.g. a triac) connected to the motor. A controller developed by Frank Nola in 1977 is exemplary of this type of power reduction system.

In the Nola controller a phase lag signal is obtained by the circuitry. The phase lag signal is compared with a command phase lag signal representing a desired minimum power factor of operation. The resulting difference signal, a circuit error signal, is then used to control the on and off time of a triac in series with the winding of the induction motor to maintain motor operation at the selected power factor. This has the effect of reducing the power input to a less than fully loaded motor.

The principle of the Nola controller is to reduce the average voltage supplied to the motor when the motor is not operating at full rated load, by switching off the voltage for a portion of each half wave cycle. A typical induction motor operates most efficiently at rated load. For loads below rated load, the efficiency drops off. The effect of reducing the voltage causes the motor to be a smaller horsepower motor at smaller loads which in turn causes the motor to operate closer to peak efficiency.

To accomplish the lowering of voltage, it is necessary to know the load at any given moment. The one variable that is easy to measure and relates to the load on the motor is phase lag of the current to the voltage. Hence the Nola controller is in reality a phase lag controller. Phase is measured and compared to a desired phase in a classical closed loop feedback system. Inherent in closed loop control is the necessity for the control to be stable along with other dynamic requirements. This can only be accomplished with negative feedback.

The Nola Design is a closed loop control scheme. In closed loop control, system stability is determined by the dynamic characteristics of the device being controlled. In Nola's case, the motor's electrical responses to changes in voltage determine the stability of the closed loop system. It is necessary to compensate the controller output with a lag to maintain stability. In addition the closed loop gain of the system must be set with sufficient gain margin to maintain stability. These factors result in several limitations.

Energy saving algorithms, optimized for lower loads, prevent a motor from producing full horsepower at full load, and also cause stalling problems whenever a motor has to exceed its maximum rated load for short periods. Nola, in order to achieve maximum energy savings, introduced an adjustable pot to adjust the controller's control points. The effect of this pot is to tune the algorithm to prevent stalling at maximum expected load. The more oversized the motor is, the more energy savings can be achieved. In instances where the motor is not oversized for its maximum load, this prevents a realization of maximum energy savings.

It would be an advance in the art to create a modified control apparatus and control algorithm that would allow for maximum energy savings at lower loads while still permitting a motor to operate a full power at higher loads.

SUMMARY OF THE INVENTION

Given the above-stated energy saving limitations of controllers, an improved controller has been designed to allow for maximum energy savings at low loads while still permitting an electric motor to operate at full voltage for higher loads. This approach permits the use of a fixed closed loop algorithm without the need for an adjustment pot. Embodiments of such a feature include the ability of a controller using an embodiment of the three phase algorithm to bypass the energy saving algorithm at loads above 70% of the rated load.

Embodiments of a controller and control algorithm according to the present invention may be designed to provide maximum energy savings for all applications. Embodiments of a controller using a digital processor may convert phase and firing angles into time values for ease and speed of calculation. Yet further embodiments of a controller according to the present invention may calculate a hold-off time based on the zero current crossing instead of a firing time based on the zero voltage crossing.

An embodiment of a control algorithm according to the present invention establishes and controls the relationship between hold-off time (A) and phase-lag (B). Specifically an embodiment of a control algorithm according to the present invention may be expressed as A=1.2 B, where A and B are both values in milliseconds. Extended to full load scenarios, such an embodiment would cause motor voltage at full load to drop by over 15%. An embodiment of a control algorithm according to the present invention solves this problem by allowing for a bypass of the energy saving algorithm at loads in excess of 70% of maximum rated load. Such an embodiment may have the bypass software operate independently of the energy saving algorithm, allowing for an extremely fast bypass response.

Advantages of the present invention include reduced power consumption of a motor controlled by an embodiment of the inventive method or inventive controller, and faster response time between the detection of load changes on the motor and the issuance of power control signals. Other advantages of the present invention include the fact that modern, high-efficiency motors cannot be stably operated with prior controller designs due to electrical dynamics and response speeds associated with the motors.

Embodiments of the present invention may include, but are not limited to, the following:

1. A method of power control for an electrical motor, the method comprising:
a) providing a desired control line function that determines hold-off time based on a detected phase lag of a motor drive signal, said control line function being an algebraic function that establishes a relationship between hold-off time and detected phase lag;
b) establishing a bypass load threshold level, said bypass threshold level having a value less than a maximum rated motor load of the motor;
c) receiving a motor drive power input from a supply having a drive voltage;
d) detecting a load level of the motor while said motor is being driven with said motor drive power input;
e) bypassing said control line function and providing full supply voltage to said motor when said load level of the motor meets of exceeds said bypass load threshold level; and
f) controlling said motor according to said control line function when said load level of the motor is less than said bypass load threshold level.

2. The method of embodiment 1, said bypass load threshold level being 70% of maximum rated load.

3. The method of embodiments 1 or 2, said desired control line function being of the form A=1.2 B, where A is the hold-off time (in milliseconds) and B is the phase lag (in milliseconds).

4. The method of any of embodiments 1-3, said detecting the load level being carried out independently of said bypassing or said controlling.

5. The method of any of embodiments 1-4, said desired control line function being of the form $A=S*B-Of$, where:
S is a line slope calculated from the expression $S=Amax/(Bnl-Bfl)$, where $Bnl$ is the phase lag of the motor at full voltage and no load, $Bfl$ is the phase lag of the motor at full voltage and rated load, and $Amax$ is the hold-off time for maximum phase reduction at no load; and
Of is an offset calculated from the expression $Of=S*Bfl$, wherein
the hold-off time, A, is calculated from the expression $A=S*B-Of$, where B is the detected phase lag.

6. The method of any of embodiments 1-5, said controlling including:
detecting the phase lag of the motor drive power input during driving;
firing a thyristor with a firing time determined from the hold-off time of the desired control line function based on said detecting the phase lag; and
firing the thyristor according to the determined firing time after detecting a current zero crossing of the motor drive power input;
wherein there is no feedback of the motor drive power input required to perform controlling.

7. The method of any of embodiments 1-6, said detecting a load level including using a current drawn by the motor as a load feedback signal.

8. A computer-readable medium having embodied thereon a computer program for power control for an electrical motor that, when executed, causes a programmable controller to execute a method of power control for an electrical motor, the method comprising:
a) providing a desired control line function that determines hold-off time based on a detected phase lag of a motor drive signal, said control line function being an algebraic function that establishes a relationship between hold-off time and detected phase lag;
b) establishing a bypass load threshold level, said bypass threshold level having a value less than a maximum rated motor load of the motor;
c) receiving a motor drive power input from a supply having a drive voltage;
d) detecting a load level of the motor while said motor is being driven with said motor drive power input;
e) bypassing said control line function and providing full supply voltage to said motor when said load level of the motor meets of exceeds said bypass load threshold level; and
f) controlling said motor according to said control line function when said load level of the motor is less than said bypass load threshold level.

9. The medium of embodiment 8, said bypass load threshold level being 70% of maximum rated load.

10. The medium of embodiments 8 or 9, said desired control line function being of the form A=1.2 B, where A is the hold-off time (in milliseconds) and B is the phase lag (in milliseconds).

11. The medium of any of embodiments 8-10, said detecting the load level being carried out independently of said bypassing or said controlling.

12. The medium of any of embodiments 8-11, said desired control line function being of the form $A=S*B-Of$, where:
S is a line slope calculated from the expression $S=Amax/(Bnl-Bfl)$, where $Bnl$ is the phase lag of the motor at full voltage and no load, $Bfl$ is the phase lag of the motor at full voltage and rated load, and Amax is the hold-off time for maximum phase reduction at no load; and Of is an offset calculated from the expression Of=S*Bfl, wherein the hold-off time, A, is calculated from the expression A=S*B−Of, where B is the detected phase lag.

13. The medium of any of embodiments 8-12, said controlling including:

detecting the phase lag of the motor drive power input during driving;

firing a thyristor with a firing time determined from the hold-off time of the desired control line function based on said detecting the phase lag; and firing the thyristor according to the determined firing time after detecting a current zero crossing of the motor drive power input;

wherein there is no feedback of the motor drive power input required to perform controlling.

14. The medium of any of embodiments 8-13, said detecting a load level including using a current drawn by the motor as a load feedback signal.

15. An apparatus for controlling power in an electrical motor, the apparatus comprising:

a hold-off time determination unit that determines hold-off time based on a detected phase lag of a motor drive signal according to a desired control-line function, said control line function being an algebraic function that establishes a relationship between hold-off time and detected phase lag such that the first derivative of the slope of the control line is a constant;

a bypass load threshold sensor that establishes a bypass load threshold level, said bypass threshold level having a value less than a maximum rated motor load of the motor;

a drive voltage input unit that recieves a motor drive power input from a supply having a drive voltage;

a motor load level detection unit that detects a load level of the motor while said motor is being driven with said motor drive power input;

a control bypass unit that bypasses control according to said control line function and provides full supply voltage to said motor when said load level detection unit detects a load level of the motor that meets of exceeds the bypass load threshold level established by said bypass threshold load sensor; and a phase control unit that controls said motor according to said control line function when said load level detection unit detects a load level of the motor that is less than the bypass load threshold level established by said bypass load threshold load sensor.

16. The apparatus of embodiment 15, said bypass load threshold sensor establishing a bypass load threshold level at 70% of maximum rated load.

17. The apparatus of embodiments 15 or 16, said desired control line function being of the form A=1.2 B, where A is the hold-off time (in milliseconds) and B is the phase lag (in milliseconds).

18. The apparatus of any of embodiments 15-17, the motor load level detection unit being a separately programmed, constantly operating component of the apparatus such that motor load level is detected during motor operation regardless of whether the phase control unit is controlling said motor.

19. The apparatus of any of embodiments 15-18, said desired control line function being of the form. A=S*B−Of, where:

S is a line slope calculated from the expression S=Amax/(Bnl−Bfl), where Bnl is the phase lag of the motor at full voltage and no load, Bfl is the phase lag of the motor at full voltage and rated load, and Amax is the hold-off time for maximum phase reduction at no load; and Of is an offset calculated from the expression Of=S*Blf, wherein the hold-off time, A, is calculated from the expression A=S*B−Of, where B is the detected phase lag.

20. The apparatus of any of embodiments 15-19, said phase control unit including:

a phase lag detector that detects the phase lag of the motor drive power input during driving;

at least one firing timer that fires a thyristor with a firing time determined from the hold-off time of the desired control line function based on said detecting the phase lag and also fires the thyristor according to the determined firing time after detecting a current zero crossing of the motor drive power input;

wherein there is no feedback of the motor drive power input to said phase control unit.

21. The apparatus of any of embodiments 15-20, said motor load level detection unit including a current feedback unit that generates a load feedback signal from a current drawn by the motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

The drawings will be described in detail in the course of the detailed description of the invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
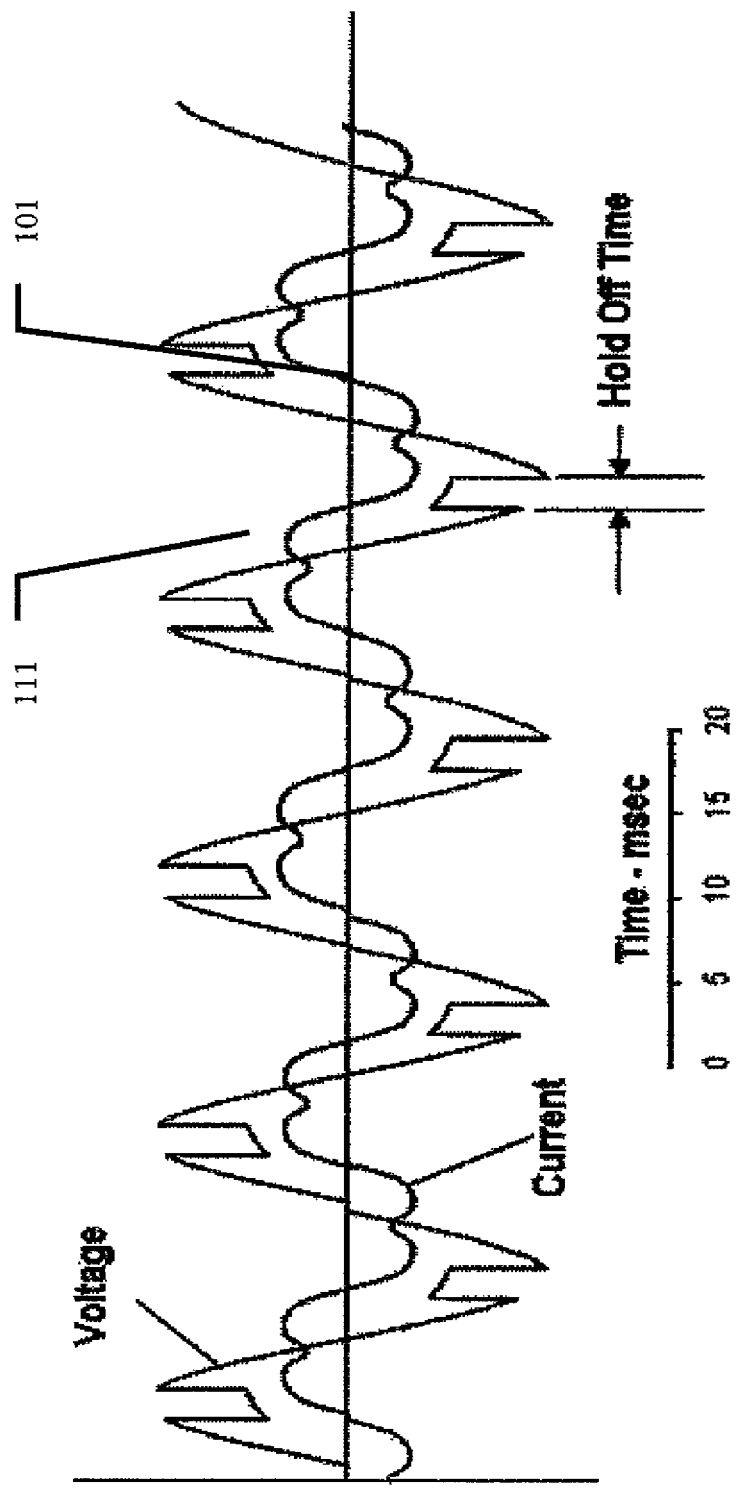
FIG. 1 is a diagram illustrating exemplary closed loop control waveforms.

The Nola Design is a closed-loop phase controller that reduces the voltage on the motor when the load is reduced by turning off the alternating current for a period of time for each half of the alternating AC, sine wave. In a recent U.S. patent application Ser. No. 11/755,627 by George Boyadjieff, filed May 30, 2007, the disclosure of which is fully incorporated by reference herein for all purposes, an improved digital controller design based on Nola's basic methods is described. The digital controller's software uses the Nola principle of control described above. Typical waveforms are shown in FIG. 1.

Figure 2:
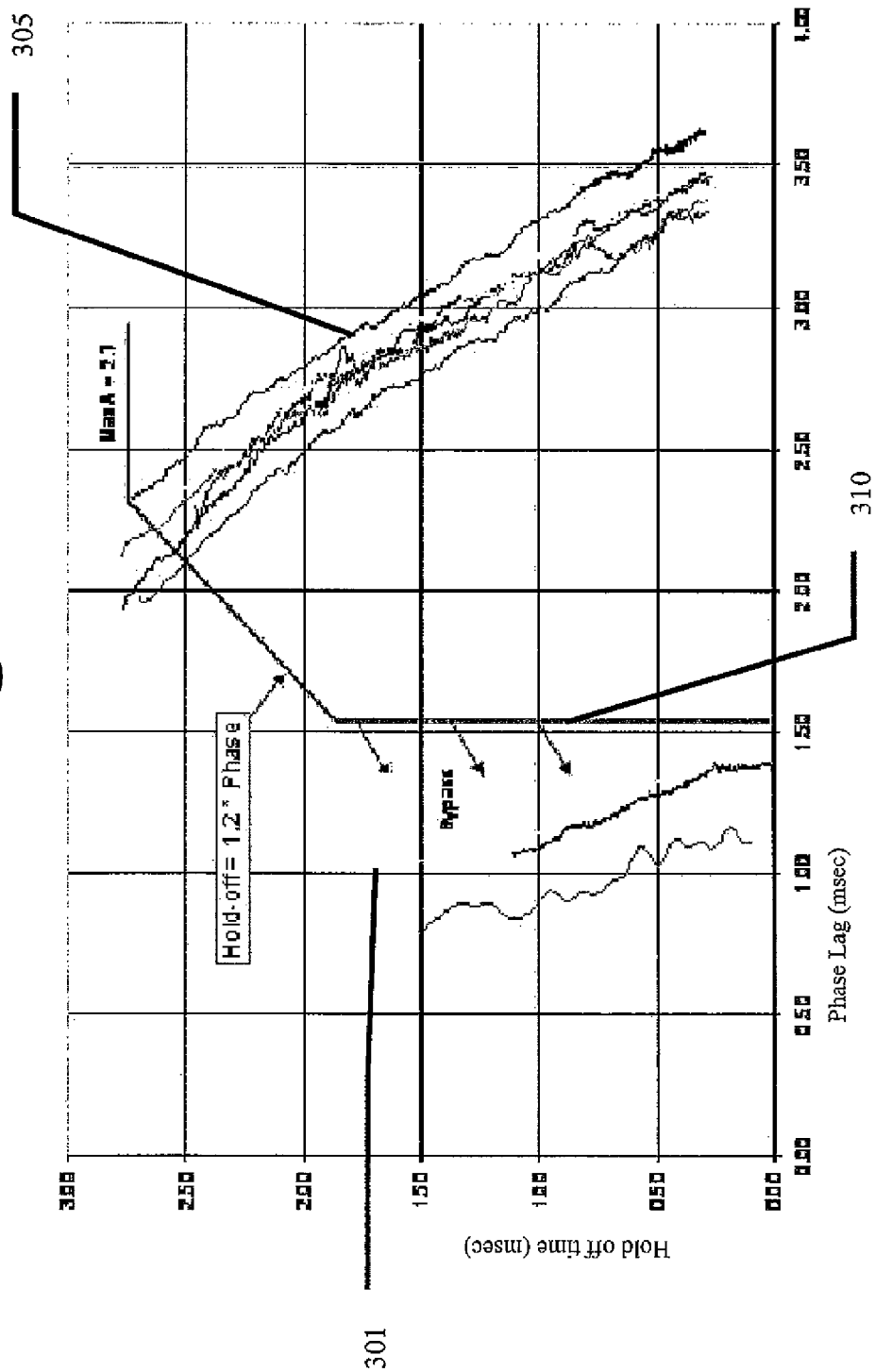
FIG. 2 illustrates hold off time versus phase lag times for both a full load condition and a no load condition of exemplary motors.

The amount of time the voltage is turned off is called the hold off time 111. Shown in FIG. 2 are curves of hold off time vs. phase lag times for both the full load condition 301 and the no load condition 305 of multiple exemplary motors. Phase lag time is defined as the time between when the voltage wave crosses the zero line 101 at zero volts and the current wave form crosses the zero line 101 at zero current. The Nola controller controls phase lag by varying the hold off time according to a control algorithm that operates across the entire range of motor loads (from zero to 100% load).

As shown in FIG. 2, the relationship between phase lag and hold off time for 100% load 301 is a nearly vertical line, indicating that variations in hold off time at 100% load do not significantly mitigate the effects of phase lag at 100% load. Furthermore, attempting to implement a linear energy savings algorithm at 100% load may cause the voltage of the motor to drop at full load, thereby making the motor seem effectively smaller. Such an effect is undesirable and detrimental to motors which are not substantially oversized for their applications.

A control algorithm according to the present invention may therefore operate based on a control line 310 that bypasses or de-activates phase lag compensation effects at or above a certain threshold motor load. Certain embodiments of such a control algorithm may be configured for a threshold of 70% of maximum rated load. Other embodiments may employ higher or lower thresholds depending on the specific operating characteristics of the motor they are connected to.

Figure 3:
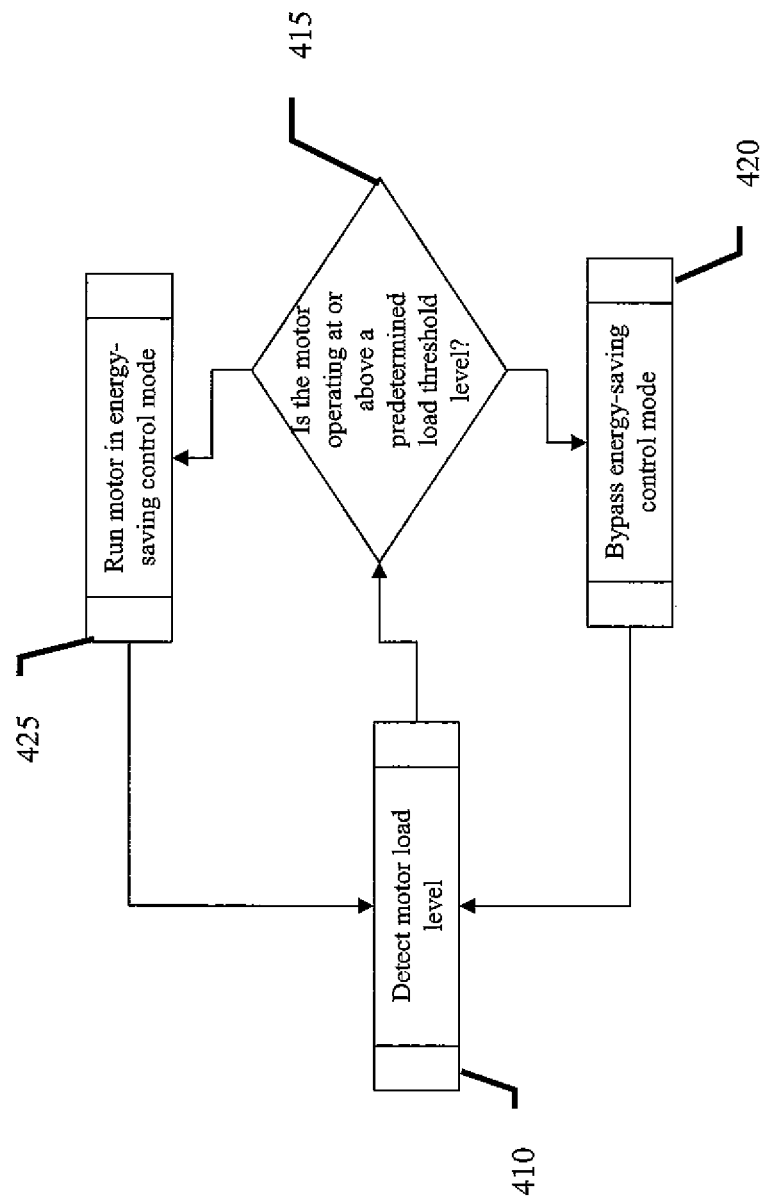
FIG. 3 is an algorithm for determining when to bypass energy saving control.

In an embodiment of the present invention, the load detection and bypass components of a controller or control algorithm according to the present invention may be stored and operated independently of the energy-saving algorithm portions. This may allow for increases in response time for the control bypass aspect, allowing a controller according to the present invention to respond quickly and effectively to sudden increases or decreases in motor load. An exemplary algorithm for bypass determination is shown in FIG. 3.

In this embodiment of a control algorithm according to the present invention, a motor load level for an operating motor is detected 410 by the controller. This load level is compared to a threshold bypass level 415 set in the control algorithm. If the motor load level is below the threshold bypass level, the bypass portion of the control algorithm is not initiated and the motor is run in an energy-saving control mode 425. If the load level meets or exceeds the threshold level, the bypass control mode 420 is initiated and the motor is allowed to run at full voltage without phase lag compensation for energy saving.

Figure 4:
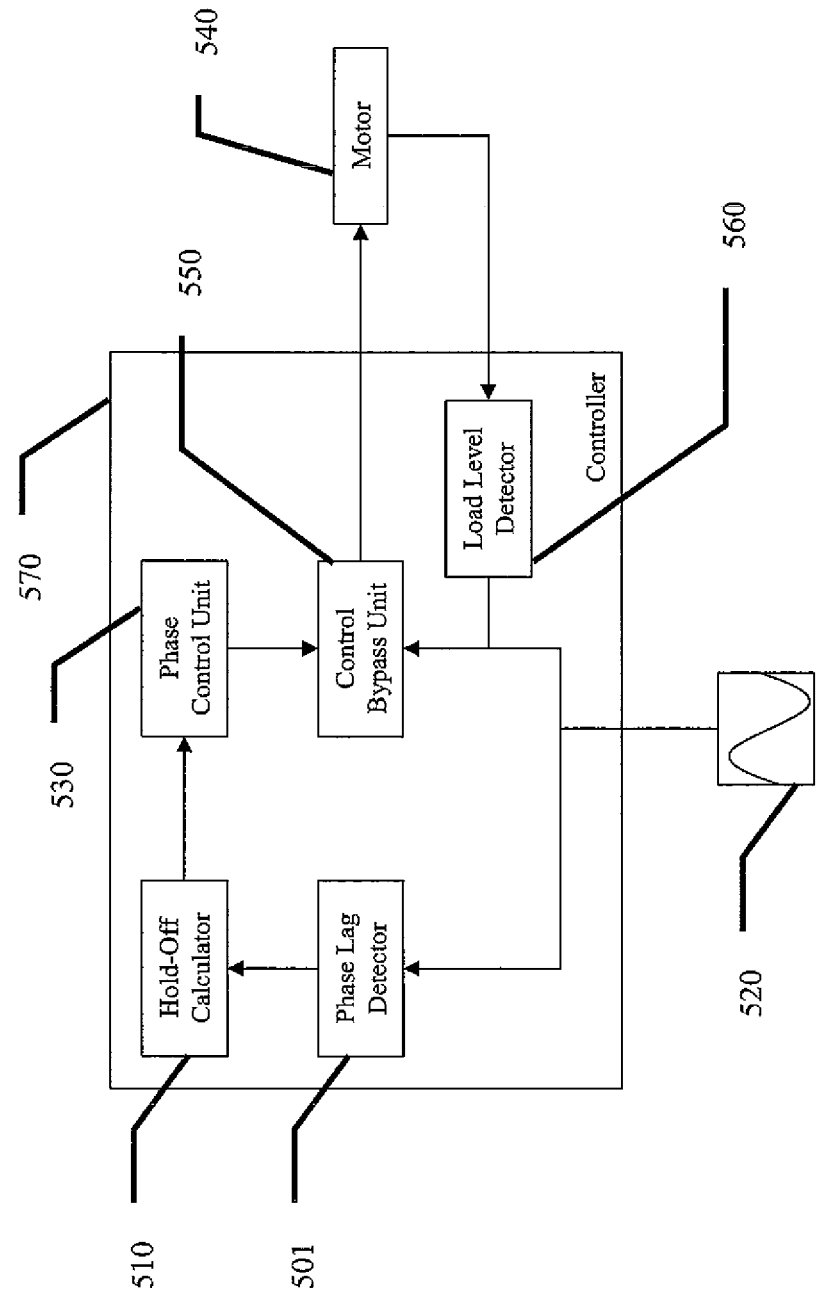
FIG. 4 is a block diagram of a phase-lag controlling controller with a control override according to the present invention.

A controller according to the present invention is depicted in FIG. 4. The controller 570 is depicted herein as being an external component between the motor 540 and the voltage source 520, however alternate embodiments may employ a controller integrated into the motor or the voltage source, or otherwise integrated into either a motor or power supply component.

In the present invention, the controller 570 receives an input motor drive signal from a power source 520 and detects both the phase lag 501 and the percentage of maximum rated motor load 560 of the motor drive signal 520. A preferred embodiment for motor load detection uses the current drawn by the motor as a load feedback signal. Alternate embodiments may use other forms of load sensing. The phase lag detector 501 in this embodiment detects the phase lag and passes this information to a hold-off time calculator 510 that, based on a desired control line function programmed into the hold-off time calculator, computes a hold-off time based on the phase lag. Alternate embodiments of the present invention may have a combined phase lag detector and hold-off time calculator unit that performs both functions. Yet further embodiments of the present invention may employ a hardwired hold-off calculator that cannot be programmed but is instead configured with one specific control line function. Yet further embodiments of the present invention may use FPGA, CPLD or other types of programmable logic components as the hold-off calculator or the phase lag detector, and may store the parameters of a desired control line function either in the same or different FPGA or CPLD unit, or in a separate memory unit that may be either volatile memory or a nonvolatile memory such as a variant of a PROM device (PROM, EAROM, EPROM, EEPROM, etc.), flash memory, or similar devices.

The hold-off time calculated by the hold-off calculator 510 is then, in the embodiment shown, passed to a phase control unit 530 that controls the firing of an appropriate thyristor or other switch device that adjusts the phase lag of the motor drive signal before providing it to the motor 540 for a desired energy saving effect. In this embodiment of the present invention, the output of the phase control unit passes through a control bypass unit 550. In other embodiments of the present invention, the control bypass unit may instead provide input to the phase control unit 530 which is directly connected to the motor 540, or the control bypass 550 and phase control 530 units may feed into a switch (not shown) that provides the output of one or the other to the motor 540. Alternate embodiments of the present invention may employ a wide range of components to fulfill the functions of the phase control unit, including programmable logic devices, volatile and non-volatile memory components, or completely custom-built devices.

In the embodiment depicted in FIG. 4, the control bypass unit 550 receives the motor drive signal 520 at the same time as the phase lag detector 501. The load level detector 540 determines the percentage of maximum rated load that the motor is currently operating at and provides this information to the control bypass unit 550. In the embodiment shown, load level detection is a constant and ongoing operation independent of the phase lag detection and phase control aspects of the controller. The control bypass unit contains either programmable or hardwired components that, upon receiving a signal from the load level detector indicating a certain load percentage, will cause a bypass of the phase lag detection and control portions of the controller and instead feed the motor drive signal directly to the motor. In the embodiment shown, this particular load percentage is 70% of maximum rated load or higher. As indicated in FIG. 2, at approximately 70% of maximum rated load, the efficiencies realized by compensating for phase lag cause more problems in effecting their realization than any actual benefit provided thereby.

Alternate embodiments of the present invention may employ a consolidated load detection and control bypass unit that integrates both functions into a single component. Yet further embodiments of the present invention may employ programmable devices for load level detection and control bypass, or may utilize embodiments where the control bypass unit is a switching device operated by a programmable or programmed load level detection unit that, upon detecting a motor load percentage at or above a threshold level, sends one switch activation signal to the control bypass unit, and upon detecting a load below the threshold level, sends a second switch activation signal to the control bypass unit. Yet further embodiments of the present invention may incorporate load level detection and load level output components or circuitry directly into a motor, or may integrate an entire phase lag control override unit into a motor such that the phase lag compensation and energy saving aspects may be contained in a controller while the motor has a built-in capability to bypass energy savings control at certain load levels. Yet further embodiments of the present invention may be implemented purely with programmable devices connected and wired together, or may be implemented as purely hardware solutions with hardwired parameters and operating characteristics.

Figure 5A:
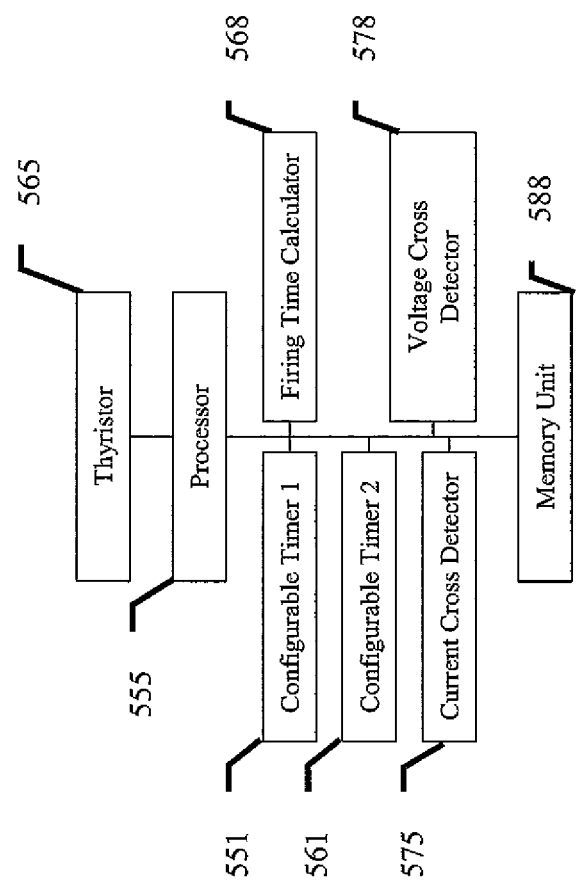
FIG. 5a is a more detailed block diagram of a phase lag control portion of a power controller according to the present invention.

FIG. 5a shows a functional diagram an alternative embodiment of an integrated phase detection, hold-off calculation, and phase control portion controller device according to the present invention. The device shown in this embodiment comprises a thyristor 565, a processor 555, a timing unit made up of a first configurable timer 551 and a second configurable timer 561, a zero cross detection unit made up of a current cross detector 575 and a voltage cross detector 578, a firing time calculator 568, and a memory unit 588 that stores cycle counts and calculated firing times.

Figure 5B:
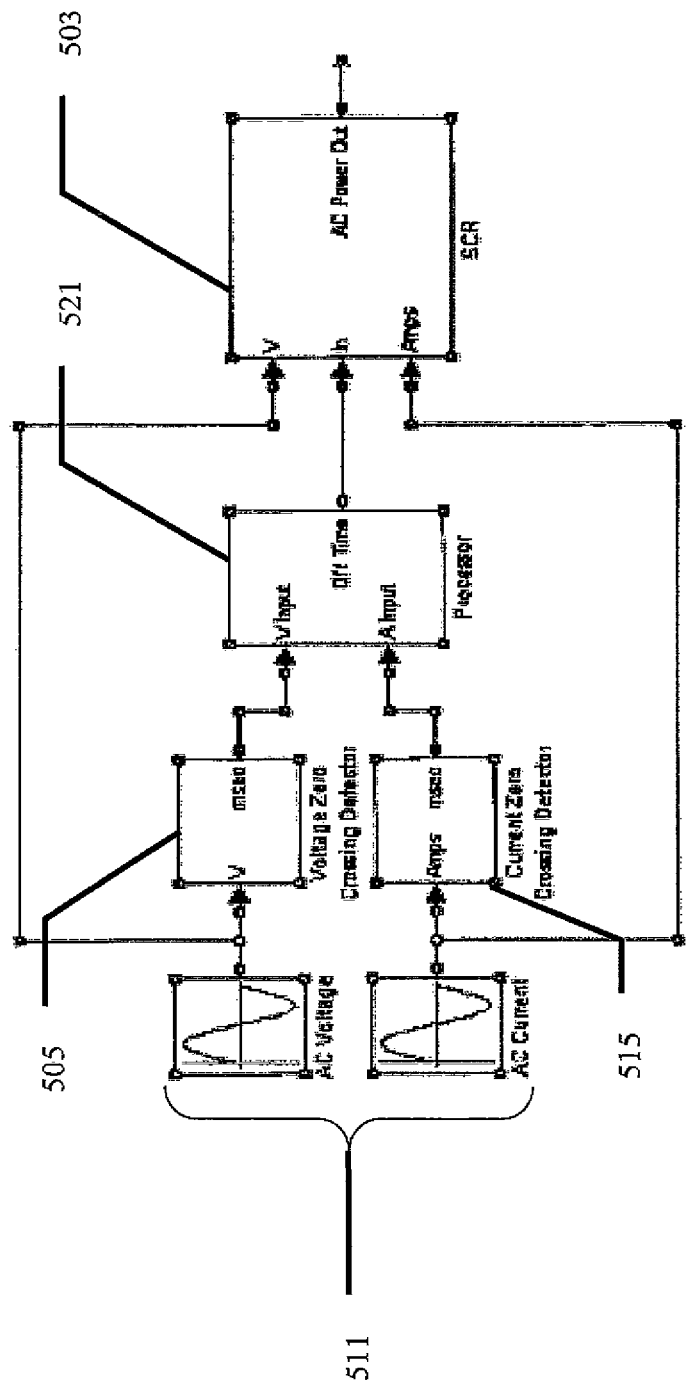
FIG. 5b is another detailed block diagram of a phase lag control portion of a power controller according to the present invention.

The first configurable timer may be used to set operating cycle times for dynamic control algorithms that may include control determination and control application periods. The cross detection unit may be used to detect zero crossings of voltage and current both during the determination and application time periods. The processor may be a programmable device that controls not only the firing of the thyristor, but the overall operation of the controller—coordinating the other components and managing the flow of information within the device. An embodiment of such a device is shown in FIG. 5b.

AC power 511 is provided to an SCR (Silicon Controlled Rectifier) bridge 503, which, in turn, is controlled by a processor 521 through appropriate firing circuits (not shown). The zero crossing point of both the voltage 505 and current 515 are detected and used with the algorithm stored in the processor 521 (which, in this embodiment, contains the processor 555, memory 580, calculation 560 and configurable timer 551 561 functions) to compute the on and off time of the SCR bridge 503 to control the power consumed by the motor.

Yet further alternative embodiments of the present invention may employ a general-purpose programmable controller programmed with a control method according to the present invention. Yet further embodiments of the present invention may employ a controller directly integrated into an electric motor, or a control program executed by a general purpose computer connected to the appropriate hardware components. The power savings approaches of the present invention may also be independent of any starting, speed, acceleration, or braking control that may be used in concert with or in addition to the principles of this invention.

The present invention may be embodied in other specific forms without departing from its spirit or essential characteristics. The described embodiments are to be considered in all respects only as illustrative and not restrictive. The scope of the invention is, therefore, indicated by the appended claim rather than by the foregoing description. All changes which come within the meaning and range of equivalency of the claims are to be embraced within their scope.

What is claimed is:

1. A method of power control for an electrical motor, the method comprising:
   a) providing a desired control line function that determines hold-off time based on a detected phase lag of a motor drive signal, said control line function being an algebraic function that establishes a relationship between hold-off time and detected phase lag;
   b) establishing a bypass load threshold level, said bypass threshold level having a value less than a maximum rated motor load of the motor;
   c) receiving a motor drive power input from a supply having a drive voltage;
   d) detecting a load level of the motor while said motor is being driven with said motor drive power input;
   e) bypassing said control line function and providing full supply voltage to said motor when said load level of the motor meets or exceeds the bypass load threshold level; and
   f) controlling said motor according to said control line function when said load level of the motor is less than said bypass load threshold level.

2. The method of claim 1, said bypass load threshold level being 70% of maximum rated load.

3. The method of claim 1, said desired control line function being of the form A=1.2 B, where A is the hold-off time (in milliseconds) and B is the phase lag (in milliseconds).

4. The method of claim 1, said detecting the load level being carried out independently of said bypassing or said controlling.

5. The method of claim 1, said desired control line function being of the form A=S*B−Of, where:
   S is a line slope calculated from the expression S=Amax/(Bnl−Bfl), where Bnl is the phase lag of the motor at full voltage and no load, Bfl is the phase lag of the motor at full voltage and rated load, and Amax is the hold-off time for maximum phase reduction at no load; and
   Of is an offset calculated from the expression Of=S*Bfl, wherein the hold-off time, A, is calculated from the expression A=S*B−Of, where B is the detected phase lag.

6. The method of claim 1, said controlling including:
   detecting the phase lag of the motor drive power input during driving;
   firing a thyristor with a firing time determined from the hold-off time of the desired control line function based on said detecting the phase lag;
   and firing the thyristor according to the determined firing time after detecting a current zero crossing of the motor drive power input;
   wherein there is no feedback of the motor drive power input required to perform controlling.

7. The method of claim 1, said detecting a load level including using a current drawn by the motor as a load feedback signal.

8. A computer-readable medium having embodied thereon a computer program for power control for an electrical motor that, when executed, causes a programmable controller to execute a method of power control for an electrical motor, the method comprising:
   a) providing a desired control line function that determines hold-off time based on a detected phase lag of a motor drive signal, said control line function being an algebraic function that establishes a relationship between hold-off time and detected phase lag;

b) establishing a bypass load threshold level, said bypass threshold level having a value less than a maximum rated motor load of the motor;

c) receiving a motor drive power input from a supply having a drive voltage;

d) detecting a load level of the motor while said motor is being driven with said motor drive power input;

e) bypassing said control line function and providing full supply voltage to said motor when said load level of the motor meets or exceeds the bypass load threshold; and f) controlling said motor according to said control line function when said load level of the motor is less than said bypass load threshold level.

9. The medium of claim 8, said bypass load threshold level being 70% of maximum rated load.

10. The medium of claim 8, said desired control line function being of the form A=1.2 B, where A is the hold-off time (in milliseconds) and B is the phase lag (in milliseconds).

11. The medium of claim 8, said detecting the load level being carried out independently of said bypassing or said controlling.

12. The medium of claim 8, said desired control line function being of the form A=S*B−Of, where:

S is a line slope calculated from the expression S=Amax/(Bnl−Bfl), where Bnl is the phase lag of the motor at full voltage and no load, Bfl is the phase lag of the motor at full voltage and rated load, and Amax is the hold-off time for maximum phase reduction at no load; and Of is an offset calculated from the expression Of=S*Bfl, wherein the hold-off time, A, is calculated from the expression A=S*B−Of, where B is the detected phase lag.

13. The medium of claim 8, said controlling including:

detecting the phase lag of the motor drive power input during driving;

firing a thyristor with a firing time determined from the hold-off time of the desired control line function based on said detecting the phase lag;

and firing the thyristor according to the determined firing time after detecting a current zero crossing of the motor drive power input;

wherein there is no feedback of the motor drive power input required to perform controlling.

14. The medium of claim 8, said detecting a load level including using a current drawn by the motor as a load feedback signal.

15. An apparatus for controlling power in an electrical motor, the apparatus comprising:

a hold-off time determination unit that determines hold-off time based on a detected phase lag of a motor drive signal according to a desired control-line function, said control line function being an algebraic function that establishes a relationship between hold-off time and detected phase lag such that the first derivative of the slope of the control line is a constant;

a bypass load threshold sensor that establishes a bypass load threshold level, said bypass threshold level having a value less than a maximum rated motor load of the motor;

a drive voltage input unit that receives a motor drive power input from a supply having a drive voltage;

a motor load level detection unit that detects a load level of the motor while said motor is being driven with said motor drive power input;

a control bypass unit that bypasses control according to said control line function and provides full supply voltage to said motor when said load level detection unit detects a load level of the motor that meets or exceeds the bypass load threshold level established by said bypass threshold load sensor; and a phase control unit that controls said motor according to said control line function when said load level detection unit detects a load level of the motor that is less than the bypass load threshold level established by said bypass load threshold load sensor.

16. The apparatus of claim 15, said bypass load threshold sensor establishing a bypass load threshold level at 70% of maximum rated load.

17. The apparatus of claim 15, said desired control line function being of the form A=1.2 B, where A is the hold-off time (in milliseconds) and B is the phase lag (in milliseconds).

18. The apparatus of claim 15, the motor load level detection unit being a separately programmed, constantly operating component of the apparatus such that motor load level is detected during motor operation regardless of whether the phase control unit is controlling said motor.

19. The apparatus of claim 15, said desired control line function being of the form A=S*B−Of, where:

S is a line slope calculated from the expression S=Amax/(Bnl−Bfl), where Bnl is the phase lag of the motor at foil voltage and no load, Bfl is the phase lag of the motor at foil voltage and rated load, and Amax is the hold-off time for maximum phase reduction at no load; and Of is an offset calculated from the expression Of=S*Blf, wherein the hold-off time, A, is calculated from the expression A=S*B−Of, where B is the detected phase lag.

20. The apparatus of claim 15, said phase control unit including:

a phase lag detector that detects the phase lag of the motor drive power input during driving;

at least one firing timer that fires a thyristor with a firing time determined from the hold-off time of the desired control line function based on said detecting the phase lag and also fires the thyristor according to the determined firing time after detecting a current zero crossing of the motor drive power input;

wherein there is no feedback of the motor drive power input to said phase control unit.

21. The apparatus of claim 15, said motor load level detection unit including a current feedback unit that generates a load feedback signal from a current drawn by the motor.

* * * * *